Patented Mar. 2, 1954

2,671,058

UNITED STATES PATENT OFFICE 2,671,058

PROCESS FOR PREPARATION OF ACID ACTIVATED CLAY

Grant A. Mickelson, Altadena, Calif., assignor to Filtrol Corporation, Los Angeles, Calif., a corporation of Delaware No Drawing. Application July 21, 1951, Serial No. 238,021

10 Claims. (Cl. 252—450)

This invention relates to acid activation of sub-bentonite clay. More particularly, it relates to the acid treatment of sub-bentonite clay to produce activated clay material especially suitable for use in thermofor catalytic cracking processes and also in fluid catalytic cracking processes, and for use incidentally as an adsorbent in the decolorization of vegetable and mineral oils.

It is well known that certain natural clays, particularly the sub-bentonites, can be treated with mineral acids, particularly sulfuric acid, to produce efficient bleaching earths and active catalytic materials.

Sub-bentonites are a group of the bentonite clays, the chief mineral constituent of which is montmorillonite. The sub-bentonites are relatively non-swelling in water as distinguished from the Wyoming type bentonite which is the swelling type. Moreover, the sub-bentonites are acid activatable to produce decolorizing material and cracking catalysts, and have predominately magnesium and calcium base exchangeable ions, as distinguished from the Wyoming type bentonite having sodium as the predominant base exchange ion.

In many of the operations involving the use of such activated clay the particle size and hardness of the material plays an important role. This is especially true when the activated clay is used as a catalyst in the thermofor and the fluid catalytic cracking processes for cracking petroleum hydrocarbons to make gasoline.

The thermofor catalytic cracking (TCC) process is characterized by continuous movement of solid catalyst through the reaction zone. The catalyst moves slowly through the reactor by gravitation and at a rate such as to give the effect of static bed operation, but at the same time catalyst is continuously being replenished. Vaporized feed stock is passed through the reactor either in countercurrent or concurrent flow relation. Spent catalyst gravitating to the bottom of the reactor is transferred by suitable elevators first to the regenerator, and, after being regenerated, to the top of the reaction zones for another pass therethrough. In this process the clay catalyst is in the form of granules having a size within the range of from about 4 to 10 mesh, and is of sufficient hardness to withstand the normal handling to which it is subjected in the process without substantial attrition. This particle size range is important to elimination of entrainment of catalyst material in the effluent vapors from the contacting zones and to the maintenance of proper flow rates through the reactor whereby optimum cracking conditions will obtain.

In the fluid catalytic cracking process, the solid catalyst is handled as a fine powder and is suspended in a stream of the hydrocarbon vapors which are to be contacted. The solid material is maintained in a freely-flowing condition at all times and can thus be handled in much the same way as a fluid. The fluidizing properties of the solid catalyst, or the ability to be suspended in the gas stream, depends upon the size and density of the particles and distribution of particle size for any velocity and density of gas stream. The larger particles must be fine enough to be easily suspended in a moving stream of gas. Although the upper limit may be varied to a considerable extent, depending upon the velocity and density of the gas stream, practical operating conditions have shown that the maximum size limit should not exceed about 150 microns in equivalent diameter for activated clay fluid catalyst. On the other hand, the catalyst should not contain particles that are too fine. Catalyst particles entrained in the effluent vapors from the contacting zone are separated from the gases in cyclone separators and electrical precipitators, such as Cottrell precipitators. These separating devices are able to effectively remove particles greater than about 10 to 20 microns in equivalent diameter, and considerable quantities of material finer than this are lost from the system. Practical considerations have shown that a fluid catalyst should have all of its particles substantially finer than 150 microns and not more than 20% of its weight made up of particles finer than 20 microns. Moreover, the solid catalyst particles should be sufficiently hard to withstand breakdown and excessive attrition losses during use in the fluid cracking units.

In conventional acid activation processes, raw clay is extruded with the proper moisture content for extrusion (about 30-40% V. M.) through a die and the extruded strands are cut off to form small cylinders or pellets about ⅛ to ¼ inch in diameter and about ¼ to ⅜ inch in length. The extruded clay pellets are then contacted with sulfuric acid, so that the concentration of the treat exceeds about 30% sulfuric acid, and heated from about 200 to 250 degrees F. until the acid is substantially consumed, after which the excess acid and salts are removed by washing and filtering, and the product finally dried.

Although the original pellets of raw clay are within the preferred size range of TCC catalyst, when contacted with acid during activation, the pellets break down or slake to produce a large quantity of activated material of fluid catalyst size and finer. The dried material thus is too fine for use in the TCC process. It is necessary, therefore, to grind the dry activated material and then separate particles of fluid catalyst size from the fines. The fines, which are smaller than about 20 microns, are mixed with the proper amount of water for extrusion, and are again extruded through a die and cut off to form TCC catalyst pellets.

In addition to the requirement of extrusion of the acid activated clay fines to produce catalyst particles within the range required for thermofor catalytic cracking, known processes of this type for producing activated clay catalyst material have the additional disadvantage of producing a large quantity of finely dispersed material, some of which is lost in the washing and separating steps.

One object of this invention is to provide a process for acid activation of clay, which will obviate the foregoing difficulties.

Another object of the invention is to provide such a process wherein raw clay is extruded or otherwise formed into the proper size pellets or nodules for use in the TCC process, and which pellets or nodules may be subjected to acid treatment, washing, and drying with substantially no slaking, thereby to produce active catalyst material of TCC size without additional extrusion or forming operations.

A further object is to provide a clay activation process in which the quantity of fines produced and lost during the acid treating and washing steps are reduced to a minimum.

Other objects and features of the present invention will be apparent from the description which follows:

I have discovered that if, in conjunction with a process for the acid activation of sub-bentonite clay to make decolorizing material or cracking catalyst, especially for thermofor catalytic cracking, the raw clay is mixed with a portion of the acid required for activation and then compressed into forms or shapes, preferably substantially uniform in size and shape, for the acid treatment, the compacted clay pellets or nodules containing acid will retain the same form throughout the activation period and during washing, whereby certain distinct advantages are obtained. The principal advantage lies in the surprising discovery that the pellets remain hard and compact during the whole of the subsequent acid contact, washing, and drying steps, and by initially compressing the clay-acid mixture into pellets or nodules of the proper size, active catalytic cracking material for use in TCC processes can be produced without the further forming or extrusion operations required by known activation processes. Another advantage is that the amount of fines lost during acid treating, washing, and drying is materially less than in customary processes. In addition, washing of the activated material can be accomplished simply by decantation, or draining, or similar procedure, thus eliminating expensive thickening and filtering operations involved in heretofore known activation processes. Another distinct advantage is that contact of the clay in the pellet or nodule with the acid mixed therewith during compaction results in more uniform activation of the product.

In accordance with the present invention, raw sub-bentonite clay, after being dried and ground, if desired, is mixed with a specific portion of the acid required for activation of the clay, and the water content of the clay is adjusted so that the resulting mixture is of a suitable consistency (about 30 to 40% V. M.) for compaction in hard, stable particles of desired shape and size. The mixture is extruded or otherwise compacted preferably into hard pellets or nodules of a size within the range for TCC catalyst, that is, from about 4 to 10 mesh. The compacted pellets or nodules are then contacted with the residual portion of the acid and heated at 200 to 250 degrees F. for one to several hours, or until the acid is substantially consumed, after which the excess acid and salts are removed simply by decantation or an equivalent procedure. Ordinarily the total acid dosage for activation, that is, the per cent sulfuric acid based on the volatile free (to constant weight at 1,700 degrees F.) raw clay, exceeds 40% and is preferably about 45 to 60%, and the concentration of the acid solution exceeds 30%, and preferably is from 35 to 40%. The activated product finally is dried and separated to specifications. A large proportion of the product is of TCC size, with a small quantity of fluid catalyst size or finer; however, the relatively large TCC material may be ground to produce fluid catalyst or decolorizing material, if desired.

By this process the above enumerated advantages are obtained and, at the same time, the resulting product will have an activity or efficiency at least as good as similar commercial materials produced by conventional activation procedures.

The invention will be more readily understood from the following detailed description.

In one embodiment of the invention, clay as it comes from the mine is crushed and ground, and then worked in a pug mill with from 5 to 30 dosage sulfuric acid to provide a uniform mixture, the sulfuric acid preferably being contained in an acid solution having a concentration of about 35 to 40%. It is then extruded under pressure to form compact and stable pellets. The moisture content of the mixture should be adjusted to a fairly narrow range for effective operation of the extrusion apparatus and in order to obtain pellets of the desired density and stability. The moisture range for effective operation during pelleting may vary with the extrusion apparatus and the particular sub-bentonite clay deposit, but usually will be found to be in the range of about 30 to 40% V. M. V. M. is defined as the total percentage of material removed from the clay mixture by heating to constant weight at 1,700 degrees F.

The clay-acid mixture preferably is forced through a die plate under high pressure and the extruded strands cut to form compacted pellets about ⅛ to ¼ inch in diameter and about ¼ to ⅜ inch in length. Although somewhat larger pellets also will perform satisfactorily, pellets as large as ½ inch in diameter and about 1 to 2 inches in length have a tendency to slake and, therefore, pellets of lesser dimensions should be used. In general, the compression into forms as by pelleting should preferably increase the density from a particle density to the density of the compressed forms, where each density is measured at the V. M. of the compacted or extruded material, at least about 7% and better results are obtained at above about 12%. Ordinarily, it will not be found practicable to increase the density more than about 25%.

Clay pellets formed with about 5 to 30, and preferably 5 to 25, dosage of sulfuric acid remain substantially whole throughout the entire activation process, including the acid contacting, washing, and drying steps. However, a harder final product is obtained by use of 10 to 20 dosage sulfuric acid, with excellent results being obtained with 15 dosage; therefore, such dosage is preferred. If higher dosages are employed, such, for example, as 40%, the pellets break down or slake promptly upon contact with the activating acid solution. Similarly, pellets formed with less than about 5 dosage sulfuric acid readily slake during activation.

The extruded pellets may be immediately contacted with the remaining portion of the acid or they may be permitted to stand or age before acid contact for a period of time up to about 24 hours. However, maximum hardness of the final product, other factors remaining the same, is realized where the pellets have been permitted to age for about 4 hours before acid contact or activation. Approximately the same hardness of the product is obtained where the pellets are aged 24 hours as results when the clay pellets are immediately contacted with acid.

Mineral acids and certain organic acids such as formic may be used in the process of this invention, but sulfuric acid is preferred.

The acid impregnated pellets immersed and activated in sulfuric acid acid solutions about 30 or 40% or stronger surprisingly remain substantially whole throughout the activation process and, consequently, can be washed free of salts and excess acid quickly and easily by a variety of methods such as decantation, percolation, or filtering. Therefore, it is preferable to use a moderately-concentrated to concentrated solution of sulfuric acid in the treat for activating compacted pellets.

Following washing, the product may be dried, preferably at a temperature of about 150 to 250 degrees F., although higher or lower temperatures may be employed, to a suitable moisture content. In practice, the pellets usually are dried at a temperature of 220 degrees F. to a V. M. content of about 10 to 25%.

Since the acid impregnated pellets remain hard and stable throughout the process, by proper selection of original pellet shape and size a final product may be obtained without additional forming or extrusion of a size suitable for use in the TCC process. If desired, however, such product may be selectively ground by any suitable grinder or crusher to fluid catalyst or decolorizing size.

While in the foregoing it has been pointed out that the acid mixed with the clay to form pellets comprises a portion of the total acid requirements for activation, it is to be understood that the concentrations of the two acid portions may differ, provided, however, that each solution is above about 10% and preferably about 30%, with best results being obtained using concentrations between about 30 and 40%, or higher.

The process of the present invention and also the benefits obtained thereby over known processes of activation which involve pelleting of the raw clay in the absence of acid are illustrated by means of the following examples. It will be understood that the invention is not limited to those specific embodiments and particular data given since the examples are given primarily for purposes of illustration.

In these examples, the sub-bentonite was obtained from the Cheto, Arizona deposit. A typical analysis of the clay from such deposit, on a volatile free basis, is as follows:

| | Per cent |
|---|---|
| Silica ($SiO_2$) | 69.0 |
| Aluminum oxide ($Al_2O_3$) | 20.3 |
| Ferric oxide ($Fe_2O_3$) | 1.8 |
| Magnesium oxide ($MgO$) | 6.9 |
| Calcium oxide ($CaO$) | 2.6 |

EXAMPLE I

A sample of sub-bentonite from the Cheto deposit was thoroughly mixed with sufficient water to provide a uniform mixture having a V. M. content of 42.5%. The mixture was then extruded through a $\frac{3}{16}$-inch die orifice and cut off into pellets of about $\frac{3}{16}$ to $\frac{1}{4}$ inch in length. The compacted pellets were then treated with 50 dosage sulfuric acid, the overall concentration being 35%, at a temperature of 220 degrees F. for three hours with a minimum of agitation. Following this, the mixture was diluted with an equal volume of water, filtered, and washed. Finally, the material was dried in a steam chest at 180 degrees F.

The pellets were completely disintegrated, and the dried material contained a large amount of very fine particles.

EXAMPLE II

A sample of the same sub-bentonite as used in Example I, after being dried to a V. M. content of 26%, was thoroughly mixed with 15 dosage sulfuric acid and sufficient water to yield a mixture having a V. M. content of 42.5%. The mixture was extruded in the same manner as described in Example I. The compacted pellets were then treated with 35 dosage of sulfuric acid, the total acid dosage (acid in pellets plus acid added) being the same (50%) as in Example I, and the overall acid concentration being 35%, at a temperature of 220 degrees F. for three hours with a minimum of agitation. After acid treatment, the material was subjected to the same operations as described in Example I.

In this case, the pellets remained hard and stable and substantially the same size and shape as extruded. Practically no fines were present in the product.

In order to evaluate the catalytic activity, a sample of the product was submitted for CAT-A evaluation. The conditions under which the product was prepared, together with the results of the CAT-A test, are set forth in Table 1.

In evaluating the catalytic activity of product produced in this and other accompanying examples, there was employed a modification of the CAT-A method as described by J. Alexander and H. G. Sharp in their article entitled "Laboratory Methods for Determining the Activity of Cracking Catalyst," on page R537, National Petroleum News, Technical Section, August 2, 1944. In this test, a standard light East Texas gas oil is charged at a rate of 5 cc. per minute for 10 minutes over 200 cc. of catalyst pellets held at 800 degrees F. and which have preferably been calcined under bone dry air at 1,050 degrees F. for 5 hours. The liquid product from the cracking test is collected at a temperature of 60 degrees F. Catalytic activity is measured in terms of the volume per cent yield of gasoline on the no-loss basis (so-called N. L. B. gasoline yield) which is the volume of 410 degrees F. endpoint gasoline distilled from the liquid cracked product expressed as a percentage of the volume of gas oil charged corrected for 100% recovery in the test. The weight per cent conversion is also determined. This value is obtained by subtracting from 100 the quantity, weight of liquid product after removal of 410 degrees F. endpoint gasoline multiplied by 100 divided by the weight of gas oil feed. The amount of coke deposited on the catalyst and the amount of gaseous product produced, both expressed as weight per cent of gas oil charged, are determined as is also the density of the gaseous product. According to the standard CAT-A procedure a sufficient number of cracking cycles are run until the gasoline yield of three different cycles check within 1.5%, weight per cent, coke yields check within .3%, and weight per cent gas values check within 1%. This standard procedure was modified in that only 2 cycles are run and the results from the second cycle only are used for evaluation of the catalyst since it has been found from long experience with the CAT-A test that the results of the second cycle are comparable to the average of the three check cycles.

Commercially acceptable catalysts should show catalytic activity ratings of about 35% N. L. B. gasoline yield or higher by the CAT-A method. The coke deposition should not exceed a certain amount in order to avoid difficulties in burning off such coke during regeneration. In general, the ratio of N. L. B. gasoline yield to coke yield should exceed about 9/1 to 10/1. The gas density values are also indicative to the characteristics of the catalyst. A high gas density is desirable and generally the gas produced during cracking should have a density of 1.2 and higher.

EXAMPLE III

A sample of the same sub-bentonite as used in Example II was pre-dried to 15% V. M. and then mixed with 5 dosage sulfuric acid and sufficient water to yield a mixture having a V. M. content of 42.5%. The uniform mixture was extruded into pellets which were treated with 45 dosage sulfuric acid and activated, washed and dried in the same manner as the sample of Example II.

The pellets, like those of Example II, remained hard and stable throughout the entire activation process and practically no fines were present in the product. The CAT-A test results on this product are given in Table 1.

EXAMPLE IV

A sample of the same pre-dried sub-bentonite as used in Example III was mixed with 25 dosage sulfuric acid and sufficient water to yield a mixture having a V. M. content of 42.5. The mixture was extruded, contacted with 25 dosage sulfuric acid, and activated, washed and dried in the same manner as the samples of Examples II and III.

Again, the pellets remained hard and stable and substantially of the same size and shape as extruded. Practically no fines were present in the product. The CAT-A test results on this product are given in Table 1.

The foregoing examples and the results set forth in Table 1 show that acid-containing pellets retain their shape and size throughout actuation, whereas acid-free pellets slake and break down badly, and further that the product from acid-containing pellets is of high catalytic activity and within the range for commercial catalyst material.

For the purpose of demonstrating more accurately the degree of breakdown or slaking during activation and washing of acid-containing clay pellets formed in accordance with this invention, as compared with acid-free clay pellets, the following four examples were run and in all of them the clay pellets were subjected to the same acid contact and washing techniques, the total acid (acid in clay pellets, if any, plus acid added in treat) in each case being 50 dosage.

EXAMPLE V

A sample of sub-bentonite from the Cheto deposit was thoroughly mixed with sufficient water to provide a uniform mixture having a V. M. content of 31.5%. The mixture was then extruded through a 3/16-inch die orifice and cut off into pellets of about 3/16 to 1/4 inch in length. The compacted pellets were then treated with 50 dosage and 35% concentration of sulfuric acid at a temperature of 220 degrees F. for 90 minutes. Following this, the material was filtered and washed. The product was submitted for wet screen analysis to determine the degree of pellet slaking or breakdown. Results of the screen analysis are given in Table 2.

EXAMPLE VI

A sample of sub-bentonite from the Cheto deposit, pre-dried to a V. M. content of 22.7%, was mixed with water to form a uniform mixture having a 32.1 V. M. content and the mixture was extruded into pellets of the same size as in Example V. Following extrusion, the compacted pellets were subjected to the same operations as described in Example V. The results of the screen analysis are given in Table 2.

EXAMPLE VII

A sample of the same pre-dried sub-bentonite as used in Example VI was pugged with 15 dosage sulfuric acid and sufficient water to yield a uniform mixture having a V. M. content of 35.9%. The pugged mixture was then subjected to the same extrusion, activation and other operations as the clay of Examples V and VI except that the pellets were contacted only with 35 dosage sulfuric acid (acid in pellets plus added acid, totaling 50 dosage) and that the activation time was only 60 minutes. The results of the screen analysis are given in Table 2.

EXAMPLE VIII

A sample of the same pre-dried sub-bentonite as employed in Examples VI and VII was mixed or pugged with 15 dosage sulfuric acid and suffi-

TABLE 1

*Summary of preparation conditions and activities of products*

| | Total V. M. of Acid-Clay Pellets | Acid Dosage in Pellets | Total Acid Dosage | Initial Acid Conc. | N. L. B. Gaso. | Wt. Percent Conv. | Wt. Percent Gas | Gas Density | Wt. Percent Coke | Ratio N. L. B. Gas/Coke |
|---|---|---|---|---|---|---|---|---|---|---|
| | *Percent* | *Percent* | *Percent* | *Percent* | | | | | | |
| Example II—42.5 | 15 | 50 | 35 | 42.3 | | | | 1.43 | | 10.1 |
| Example III—42.5 | 5 | 50 | 35 | 43.4 | 48.1 | 5.4 | 1.38 | 4.3 | 11.0 |
| Example IV—42.5 | 25 | 50 | 35 | 44.6 | 48.4 | 4.7 | 1.45 | 4.4 | | cient water to yield a uniform mixture having a V. M. content of 37.2%. The pugged mixture was extruded into pellets about ½ inch in diameter and 1 inch in length. The compacted pellets then were subjected to the same activation with 35 dosage sulfuric acid, and other operations, as the clay in Example VII except that the activation period was 75 minutes. In Table 2 are given the results of the screen analysis on the product.

TABLE 2

*Size distribution of activated and washed pellets*

| | Examples | | | |
|---|---|---|---|---|
| | V | VI | VII | VIII |
| +3 mesh _____ percent __ | | | | 55.0 |
| −3 and +5 mesh _____ do __ | 4.2 | 13.9 | 93.7 | 25.3 |
| −5 and +8 mesh _____ do __ | 18.7 | 30.4 | 3.9 | 9.4 |
| −8 and +12 mesh _____ do __ | 28.0 | 31.4 | 0.7 | 3.1 |
| −12 and +20 mesh _____ do __ | 18.6 | 11.7 | 0.3 | 1.9 |
| −20 and +32 mesh _____ do __ | 7.3 | 3.2 | 0.2 | 1.1 |
| −32 and +80 mesh _____ do __ | 6.6 | 3.3 | 0.4 | 1.4 |
| −80 mesh _____ do __ | 16.6 | 6.1 | 0.8 | 2.8 |

The results presented in Table 2 show the effect of pelleting clay with acid upon maintaining pellets in their original hard and stable condition throughout the activation process. Although acid-containing pellets of a relatively large size, as, for example, ½ inch in diameter, have some tendency to slake during acid contacting or washing, acid-free pellets even as small as 3/16 inch in diameter slake much worse and yield a large quantity of material less than 12 mesh. Acid-containing pellets about 3/16 inch in diameter have substantially no tendency to slake and yield a product containing less than 3% of material of a size finer than 8 mesh, as compared with acid-free pellets of similar size which yield a product containing as much as 55% of material less than 8 mesh. Also, it will be noted that a relatively great amount of material finer than 80 mesh is contained in the product from acid-free pellets as compared with the product from acid-containing pellets.

In another embodiment of this invention, the clay-acid mixture is compacted by tumbling or rolling the mixture in a continuously revolving cylinder or tumbler whereby the mixture is formed into balls or nodules of a desired diameter. The compacted acid-containing nodules are then subjected to acid-treatment, washing, and drying in the manner disclosed hereinbefore in connection with extruded pellets. The amount of acid added to the clay in the formation of the compacted nodules, the amount of acid with which the nodules are contacted during activation (and consequently the total acid dosage), the time and temperature for activation, and the required washing are essentially the same as for extruded acid-containing pellets.

In accordance with this invention, nodules or balls of clay containing from 5 to 30, and preferably 5 to 25, dosage sulfuric acid are formed by pugging or thoroughly mixing the sub-bentonite clay with the desired amount of acid for a time sufficient to produce a uniform mixture. Usually 30 minutes pugging will be sufficient. The clay-acid mixture is placed in a revolving cylinder or tumbler wherein the mixture rolls over and over. The clay-acid mixture is sprayed with a finely atomized water spray as the tumbler is continuously revolved. The water spray moistens the clay mixture, and the rolling action, together with the compaction force exerted on material as it falls during the revolving of the drum, causes the mixture to be compressed into balls or nodules. The amount of water that is sprayed onto the clay controls the size of the balls; the more the water, the larger the balls. When the balls have reached the desired size, preferably from about 4 to 10 mesh, the water spray is discontinued, but the nodules are rolled for an additional period of about an hour or more to further compact the clay into hard, stable nodules.

This embodiment of the invention in which the clay-acid mixture is compacted into nodules by use of a revolving cylinder or tumbler, and the benefits obtained thereby over nodules of clay formed in the same manner, but acid-free, are further illustrated by means of the following examples.

EXAMPLE VIII(a)

A sample of sub-bentonite from the Cheto deposit, dried to a V. M. content of about 20%, was pugged with 15 dosage and 35% concentration of sulfuric acid for about 30 minutes. The acid-clay mixture was then placed in a continuously revolving tumbler and water was atomized onto the batch of the mixture until nodules of about 5 mesh were formed. The water spray was, at that time, discontinued, but the nodules were tumbled for an additional period of one hour to compact the nodules into hard, stable balls. The nodules had a V. M. content of 39.2%. Then the compacted nodules were treated with an acid solution containing an additional quantity (35 dosage) of sulfuric acid, sufficient to make a total acid dosage (acid dosage contained in compacted nodules plus added in treat) of 50%, at a temperature of 220 degrees F. for 3 hours. Following acid treatment, the nodules were washed by decantation using several batches of water, the water being adequate to reduce the acidity of the nodules to between 5 and 10 mg. KOH per gram 20% V. M. product.

The activated nodules remained hard and stable and substantially of the same size as formed. Practically no slaking of the nodules was observed. In order to evaluate the catalytic activity of the activated nodules, a sample of the product was submitted for CAT-A evaluation. The results of the CAT-A test are set forth in Table 3.

EXAMPLE IX

A sample of the same predried sub-bentonite as in Example VIII was pugged with 20 dosage and 35% concentration of sulfuric acid for about 30 minutes and the mixture was compacted into nodules, and activated with 30 dosage of sulfuric acid (total dosage of sulfuric acid of 50%), and washed in the same manner as in Example VIII. The nodules, like those of Example VIII, remained hard and stable throughout the entire process, and practically no slaking was observed. The CAT-A test results on this product are given in Table 3.

EXAMPLE X

A sample of the Cheto sub-bentonite dried to a V. M. content of about 20% was pugged with 15 dosage sulfuric acid, formed into nodules or balls by tumbling, acid contacted with 35 dosage sulfuric acid (total acid dosage of 50%), and washed in the same manner and under the same conditions as described in Example VIII, except the activation time (period during which the compacted nodules were contacted with the second portion of the acid) was 150 minutes, instead of 3 hours.

Again the nodules remained hard and stable during activation and washing. The results of the CAT-A test on the product are given in Table 3.

EXAMPLE XI

Another sample of the pre-dried sub-bentonite from the Cheto deposit was pugged with 15 dosage sulfuric acid, formed into nodules by tumbling, acid contacted with 35 dosage sulfuric acid, and washed by the same procedure and under the same conditions as in Example VIII, except here the activation time was only one hour.

There was substantially no breakdown of the nodules during the entire process. The CAT-A test was made on the product and the results thereof are presented in Table 3.

EXAMPLE XII

In order to compare the stability of acid-impregnated compacted nodules with similar nodules produced in the same manner but containing no acid, a sample of the same pre-dried sub-bentonite as used in Examples VIII to XI was pugged with water only, placed in the revolving tumbler and water was atomized thereon until nodules of about 5 mesh were formed. The spray was then discontinued but, as in the other examples, the nodules were tumbled for an additional period of one hour. The compacted nodules, having a V. M. content of 35.3%, then were treated with 50 dosage and 35% concentration of sulfuric acid at a temperature of 220 degrees F. for 3 hours. Thereafter the nodules were washed and filtered.

The nodules badly slaked and broke down into very fine particles.

TABLE 3

| Acid Dosage in Nodules | Total Acid Dosage | Initial Acid Conc. | N. L. B. Gas | Weight Percent Conv. | Weight Percent Gas | Gas Density | Weight Percent Coke |
|---|---|---|---|---|---|---|---|
| | Percent | Percent | | | | | |
| Example VIII—15% | 50 | 35 | 42.6 | 49.6 | 6.8 | 1.50 | 4.7 |
| Example IX—20% | 50 | 35 | 42.1 | 51.0 | 9.7 | 1.42 | 5.5 |
| Example X—15% | 50 | 35 | 39.6 | 44.2 | 5.4 | 1.57 | 3.4 |
| Example XI—15% | 50 | 35 | 43.3 | 47.2 | 4.8 | 1.42 | 4.0 |
| Example XII—0% | 50 | 35 | | | | | |

From an examination of Table 3, it will be seen that the activated clay pellets produced in accordance with the present invention by activating raw clay pellets hardened by the incorporation therein of a portion of the acid required to activate the clay had a catalytic activity well within the range for commercial operations. Specifically, the activated clay pellets produced in accordance with the invention as described in the examples when tested by the modified CAT-A method showed a N. L. B. gasoline of at least 39.6 and a weight per cent conversion of at least 44.2.

The results of the above experiments show that hard, stable nodules which will not slake or break down during acid activation and washing may be prepared by tumbling a clay mixture having between 5 and 30 dosage acid, as well as by extrusion. It is further shown that mere compaction without the inclusion of acid in the clay is not sufficient and such acid-free nodules badly slake and break down during activation and washing. Moreover, the acid-containing nodules upon activation yield catalyst of high catalytic activity and well within the activity range for commercial catalyst.

While particular embodiments and examples of this invention have been set forth and described herein, it will be understood that various modifications and adaptations thereof may be made without departing from the spirit and scope of the invention as set forth in the appended claims. For example, other methods, such as briquetting, may be employed for compacting the clay-acid mixture into hard, stable pellets or nodules of the desired size.

I claim:

1. In a process for acid activating an acid activatable clay in which raw uncalcined clay in the form of pellets of substantially uniform size and shape is treated with a mineral acid and thereafter is washed to remove soluble salts and excess acid and dried, the improvement of hardening the pellets sufficient to prevent breakdown of the pellets during acid activation of the clay with the mineral acid and also during washing of the activated clay which comprises mixing with the raw unpelleted clay 5 to 30 weight per cent of mineral acid based on the volatile free weight of the clay, pelleting the clay-acid mixture, and treating the pelleted uncalcined clay-acid mixture with an additional amount of mineral acid sufficient to bring about acid activation of the pelleted clay.

2. In a process for acid activating an acid activatable clay in which raw uncalcined clay in the form of pellets of substantially uniform size and shape is treated with a mineral acid and thereafter is washed to remove soluble salts and excess acid and dried, the improvement of hardening the pellets sufficient to prevent breakdown of the pellets during acid activation of the clay with the mineral acid and also during washing of the activated clay which comprises mixing with the raw unpelleted clay 10 to 20 weight per cent of mineral acid based on the volatile free weight of the clay, pelleting the clay-acid mixture, and treating the pelleted uncalcined clay-acid mixture with an additional amount of mineral acid sufficient to bring about acid activation of the pelleted clay.

3. In a process for acid activating an acid activatable clay in which raw uncalcined clay in the form of pellets of substantially uniform size and shape is treated with a mineral acid and thereafter is washed to remove soluble salts and excess acid and dried, the improvement of hardening the pellets sufficient to prevent breakdown of the pellets during acid activation of the clay with the mineral acid and also during washing of the activated clay which comprises mixing with the raw unpelleted clay 5 to 30 weight per cent of mineral acid based on the volatile free weight of the clay, extruding the clay-acid mixture, and treating the extruded uncalcined clay-acid mixture with an additional amount of mineral acid sufficient to bring about acid activation of the extruded clay.

4. In a process for acid activating an acid activatable clay in which raw uncalcined clay in the form of pellets of substantially uniform size and shape is treated with a mineral acid and thereafter is washed to remove soluble salts and excess acid and dried, the improvement of hardening the pellets sufficient to prevent breakdown of the pellets during acid activation of the clay with the mineral acid and also during washing of the activated clay which comprises mixing with the raw unpelleted clay 5 to 30 weight per cent of concentrated mineral acid based on the volatile free weight of the clay, adjusting the moisture content of the clay-acid mixture so as to produce a consistency suitable for pelleting of the mixture into hard stable pellets, pelleting the mixture, and treating the pelleted uncalcined clay-acid mixture with an additional amount of mineral acid sufficient to bring about acid activation of the pelleted clay.

5. In a process for acid activating an acid activatable clay in which raw uncalcined clay in the form of pellets of substantially uniform size and shape is treated with a mineral acid and thereafter is washed to remove soluble salts and excess acid and dried, the improvement of hardening the pellets sufficient to prevent breakdown of the pellets during acid activation of the clay with the mineral acid and also during washing of the activated clay which comprises mixing with the raw unpelleted clay 10 to 20 weight per cent of concentrated mineral acid based on the volatile free weight of the clay, adjusting the moisture content of the clay-acid mixture so as to produce a consistency suitable for pelleting of the mixture into hard stable pellets, pelleting the mixture, and treating the pelleted uncalcined clay-acid mixture with an additional amount of mineral acid sufficient to bring about acid activation of the pelleted clay.

6. In a process for acid activating an acid activatable clay in which raw uncalcined clay in the form of pellets of substantially uniform size and shape is treated with a mineral acid and thereafter is washed to remove soluble salts and excess acid and dried, the improvement of hardening the pellets sufficient to prevent breakdown of the pellets during acid activation of the clay with the mineral acid and also during washing of the activated clay which comprises mixing with the raw unpelleted clay 5 to 30 weight per cent of mineral acid in an aqueous solution containing sufficient water such that the mixture is capable of being extruded into hard stable pellets, pelleting the mixture, and treating the pelleted uncalcined clay-acid mixture with an additional amount of mineral acid sufficient to bring about acid activation of the pelleted clay.

7. In a process for acid activating an acid activatable clay in which raw uncalcined clay in the form of pellets of substantially uniform size and shape is treated with a mineral acid and thereafter is washed to remove soluble salts and excess acid and dried, the improvement of hardening the pellets sufficient to prevent breakdown of the pellets during acid activation of the clay with the mineral acid and also during washing of the activated clay which comprises mixing with the raw unpelleted clay 10 to 20 weight per cent of mineral acid in an aqueous solution containing sufficient water such that the mixture is capable of being extruded into hard stable pellets, pelleting the mixture, and treating the pelleted uncalcined clay-acid mixture with an additional amount of mineral acid sufficient to bring about acid activation of the pelleted clay.

8. In a process for acid activating an acid activatable clay in which raw uncalcined clay in the form of pellets of substantially uniform size and shape is treated with a mineral acid and thereafter is washed to remove soluble salts and excess acid and dried, the improvement of hardening the pellets sufficient to prevent breakdown of the pellets during acid activation of the clay with the mineral acid and also during washing of the activated clay which comprises mixing with the raw unpelleted clay 5 to 30 weight per cent of mineral acid based on the volatile free weight of the clay, pelleting the clay-acid mixture, aging the mixture for a period of from 1 to 24 hours, and treating the pelleted uncalcined clay-acid mixture with an additional amount of mineral acid sufficient to bring about acid activation of the pelleted clay.

9. In a process for acid activating an acid activatable clay in which raw uncalcined clay in the form of pellets of substantially uniform size and shape is treated with a mineral acid and thereafter is washed to remove soluble salts and excess acid and dried, the improvement of hardening the pellets sufficient to prevent breakdown of the pellets during acid activation of the clay with the mineral acid and also during washing of the activated clay which comprises mixing with the raw unpelleted clay 10 to 20 weight per cent of mineral acid based on the volatile free weight of the clay, pelleting the clay-acid mixture, aging the mixture for a period of from 1 to 24 hours, and treating the pelleted uncalcined clay-acid mixture with an additional amount of mineral acid sufficient to bring about acid activation of the pelleted clay.

10. In a process for acid activating an acid activatable clay in which raw uncalcined clay in the form of pellets of substantially uniform size and shape is treated with a mineral acid and thereafter is washed to remove soluble salts and excess acid and dried, the improvement of hardening the pellets sufficient to prevent breakdown of the pellets during acid activation of the clay with the mineral acid and also during washing of the activated clay which comprises mixing with the raw unpelleted clay 10 to 20 weight per cent of mineral acid based on the volatile free weight of the clay, extruding the clay-acid mixture, aging the mixture for a period of from 1 to 24 hours, and treating the extruded uncalcined clay-acid mixture with an additional amount of mineral acid sufficient to bring about acid activation of the extruded clay.

GRANT A. MICKELSON.

References Cited in the file of this patent
UNITED STATES PATENTS

| Number | Name | Date |
|---|---|---|
| 2,551,580 | Bond | May 8, 1951 |
| 2,582,956 | Bond | Jan. 22, 1952 |